July 25, 1967 J. E. POLISSO 3,332,223
RAKE WITH DOUBLE SETS OF TINES
Filed July 24, 1964
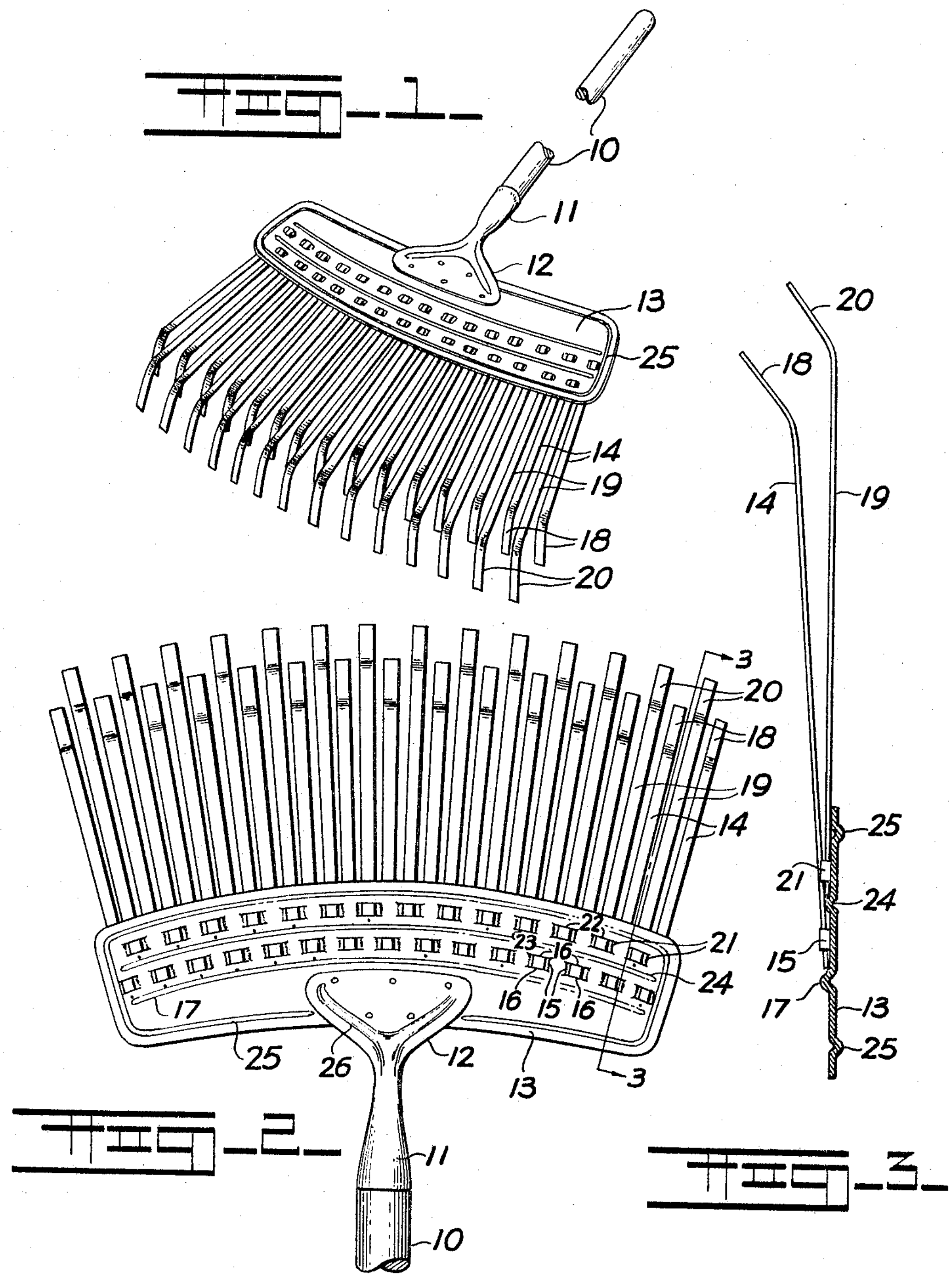
INVENTOR.
James E. Polisso.
BY
W. B. Harpman
ATTORNEY.

3,332,223

RAKE WITH DOUBLE SETS OF TINES

James E. Polisso, 720 Indianola Road, Youngstown, Ohio 44512

Filed July 24, 1964, Ser. No. 384,947
2 Claims. (Cl. 56—400.17)

This invention relates to a rake and more particularly to a rake which is used for raking grass, leaves and the like.

The principal object of the invention is the provision of a rake suitable for raking grass, leaves and the like and which rake is designed to engage more of the surface being raked with a more efficient raking action.

A further object of the invention is the provision of a rake having a double row of tines of different lengths arranged so that one row of tines is spaced relative to the other row.

A still further object of the invention is the provision of a rake wherein the tines may be made of resilient spring steel and manufactured at low cost and assembled to a common body member.

A still further object of the invention is the provision of a rake in which a double row of tines are provided and means for positioning the tines in spaced and tensioned relation to one another is provided.

Still another object of the invention is the provision of a rake in which any of the above objects may be realized and which rake can be manufactured with inexpensive manufacturing equipment at low cost.

The rake shown herein comprises an improvement relating to grass and leaf rakes and wherein the tines are generally sections of thin strip steel secured to a body member which in turn is mounted on a handle. Such rakes as have heretofore been known in the art have worked reasonably well, but required a number of raking motions to completely remove grass, grass clippings, leaves or other debris.

The present rake provides a rake of this type with double the number of tines and arranges these tines in spaced, staggered rows so that as the rake is used, practically all of the surface is engaged by the tines thereby greatly reducing the number of raking operations necessary to remove debris from a given area.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the improved rake with portions of the handle broken away.

FIGURE 2 is an enlarged plan view of the rake with portions of the handle broken away.

FIGURE 3 is a cross section in enlarged detail on line 3—3 of FIGURE 2.

By referring to the drawings and FIGURE 1 in particular, it will be seen that a rake has been disclosed which comprises an elongated handle 10, the one end of which is fitted into a socket 11 on a generally triangular body member 12 which in turn is secured as by spot welding to a generally rectangular body member 13. The body member 13 mounts a plurality of tines and which tines are arranged in two spaced rows. A first row of tines 14, 14 are secured to the body member 13 on approximately its longitudinal center line, by engaging the individual tines 14, 14 through laterally spaced depending loops 15, 15 which are formed between transversely spaced slits 16, 16 as may be seen by referring to FIGURES 2 and 3 of the drawings.

The loops 15, 15 thus formed in the rectangular body member 13 are of a size and shape accommodating the tines 14, 14 adjacent their innermost ends and the ends of the tines 14 are engaged against a longitudinally extending depressed rib 17.

By referring again to FIGURE 1 of the drawings, it will be observed that the row of tines 14, 14 have their forward ends bent on an angle relative to their general plane and the tines are arranged so that the angular end portions are downturned. These are indicated in the drawings by the reference numerals 18, 18. The second set of tines 19, 19 are the same size and shape as the first set of tines 14, 14 and they also have angularly disposed outer end portions which are indicated by the numerals 20, 20. The inner ends of the second set of tines 19, 19 are engaged in a plurality of longitudinally spaced secondary loops 21, 21 which loops are defined by longitudinally spaced, transversely spaced slits 22 and 23 respectively. The innermost ends of the secondary set of tines 19, 19 are engaged against a transversely extending depressed rib 24.

By referring to FIGURE 2 of the drawings, it will be observed that the generally rectangular body member actually has its forward and rearmost edges in a flattened arcuate shape and that the depressed ribs 17 and 24 are in an arcuate pattern and that the spaced rows of loops 15 and 21 are also arranged on arcs so that the sets of tines 14 and 19 are arranged in fan-like configuration. It will be seen that the downturned ends 18 and 20 of the sets of tines 14 and 19 are thus staggered in relation to one another and so positioned as to very thoroughly engage debris, grass clippings, leaves and the like to be raked thereby.

The spacing of the individual tines is much closer than as heretofore been practiced in such rakes, and the number of tines is substantially double the number of tines that have heretofore been believed necessary in a rake. The arrangement of the mounting and positioning and length of the sets of tines 14 and 19 is such that the rake is most efficient in a raking action and thereby requires considerably fewer raking motions to achieve the same clearing or raking effect.

It will be seen by referring to FIGURES 2 and 3 of the drawing that the body member 13 may be simply and inexpensively formed from sheet metal, such as steel by stamping the same in a blanking and forming operation whereby the rigidity of the pieces is enhanced by the longitudinally extending elongated ribs 17 and 24 and additionally by a raised peripheral rib 25.

The generally triangular body member 12 which has the socket 11 formed integrally therewith in which one end of the handle 10 is positioned is also reinforced and made more rigid by the formation therein of a Y-shaped strengthening raised rib 26.

It will thus be seen that a substantially improved leaf rake or grass rake has been disclosed which may be inexpensively and quickly manufactured on low-cost equipment, which rake will in use substantially reduce the raking motion necessary to clear a given area of grass clippings, leaves, or other debris. It will be recognized by those skilled in the art that the novelty in the disclosure relates to the arrangement of the sets of tines so that while the tines are of the same length and configuration, their mounting and arrangement in the common mounting body member 13 is such that they are positioned in angular relation to one another as well as in spaced fan-like relation to one another and that they therefore enable the respective angular ends 18 and 20 of the sets of tines to simultaneously engage a work surface, such as a lawn or a driveway to be raked, when the rake is held at a conventional angle by the person using the same.

It will be seen that this is accomplished by the novel arrangement of the means securing the ends of the tines to the body member 13 and the fact that the limiting depressed rib 24 acts in a dual function; one, by abutting the innermost ends of the set of tines 19, and; two, in elevating the set of tines 14 relative to the surface of the body member 13 to which they are attached so that there is an angular relation between the sets of tines as best illustrated in FIGURE 3 of the drawings.

It will thus be seen that leaf or lawn rake meeting the several objects of the invention has been disclosed and having thus described my invention, what I claim is:

1. A rake comprising a body member having two sets of resilient metal tines secured thereto, in sidewardly spaced relation with the ends of the tines arranged in staggered relation to one another, means on said body member for securing a handle thereto and a handle engaged in said last-mentioned means, said body member being generally rectangular and having a plurality of longitudinally spaced loops formed integrally therewith in transversely spaced locations and said tines being engaged in said loops, longitudinally extending ribs being formed adjacent each of said longitudinally spaced loops and serving as abutment means for the ends of said tines positioned in said loops, and one of the sets of tines being spaced angularly with respect to the other set of tines transversely of the body member by engagement over one of said ribs.

2. The rake as set forth in claim 1 and wherein the body member is a substantially one piece planar member, and the said loops and ribs are struck out therefrom.

References Cited

UNITED STATES PATENTS

| | | | |
|---|---|---|---|
| 1,735,237 | 11/1929 | Dennis | 56—400.17 |
| 1,772,571 | 8/1930 | Withington | 56—400.18 |
| 1,925,357 | 9/1933 | Withington | 56—400.18 |
| 2,707,366 | 5/1955 | Gartner | 56—400.17 X |
| 2,883,820 | 4/1959 | Bissell | 56—400.17 |

ABRAHAM G. STONE, *Primary Examiner.*

P. A. RAZZANO, *Assistant Examiner.*